C. C. FARMER.
LOCOMOTIVE BRAKE EQUIPMENT.
APPLICATION FILED JULY 23, 1920.

1,394,074.

Patented Oct. 18, 1921.
2 SHEETS—SHEET 2.

INVENTOR
CLYDE C. FARMER
BY *Wm. M. Cady*
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE BRAKE EQUIPMENT.

1,394,074.  Specification of Letters Patent.  Patented Oct. 18, 1921.

Application filed July 23, 1920. Serial No. 398,470.

*To all whom it may concern:*

Be it known that I, CLYDE C. FARMER, a citizen of the United States, residing at Edgewood, in the county of Allegheny and State of Pennsylvania, have invented new and useful Improvements in Locomotive Brake Equipments, of which the following is a specification.

This invention relates to fluid pressure brakes, and more particularly to a locomotive fluid pressure brake equipment.

My invention has special reference to a locomotive brake equipment for electric locomotives, in which the brakes may be controlled from either end of the locomotive.

Electric locomotives are often of considerable length which necessitates the use of long brake controlling pipes from the operating ends of the locomotive.

One object of my invention is to provide a locomotive brake equipment having means for reducing the active length of certain brake controlling pipes.

Another object of my invention is to provide for the independent control of the brakes on the second locomotive, in double heading.

Another object of my invention is to provide a locomotive brake equipment adapted to be operated from either end of the locomotive and employing only one brake controlling valve device.

Other objects and advantages will appear in the following more detailed description of the invention.

Figure 1:
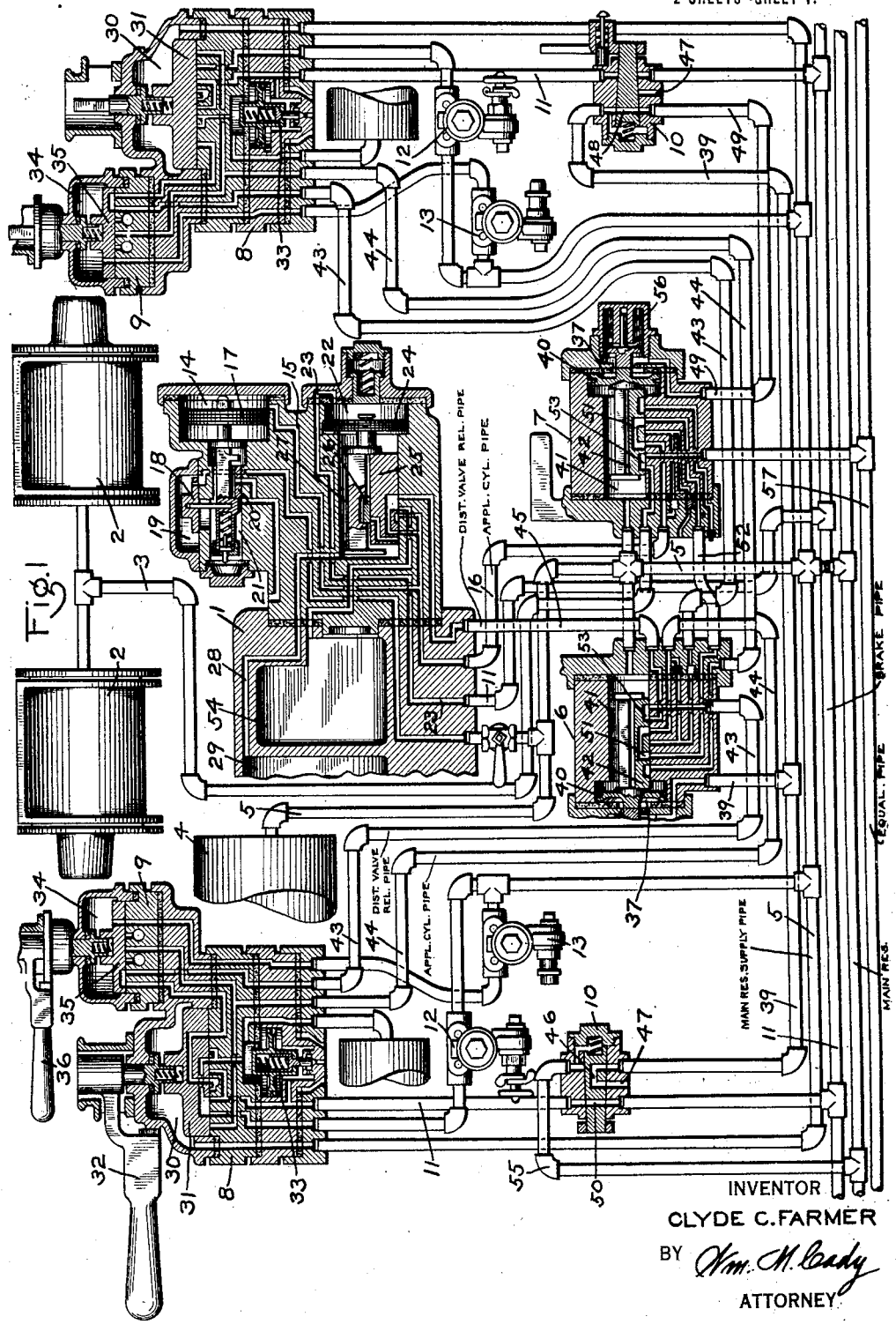
Figure 2:
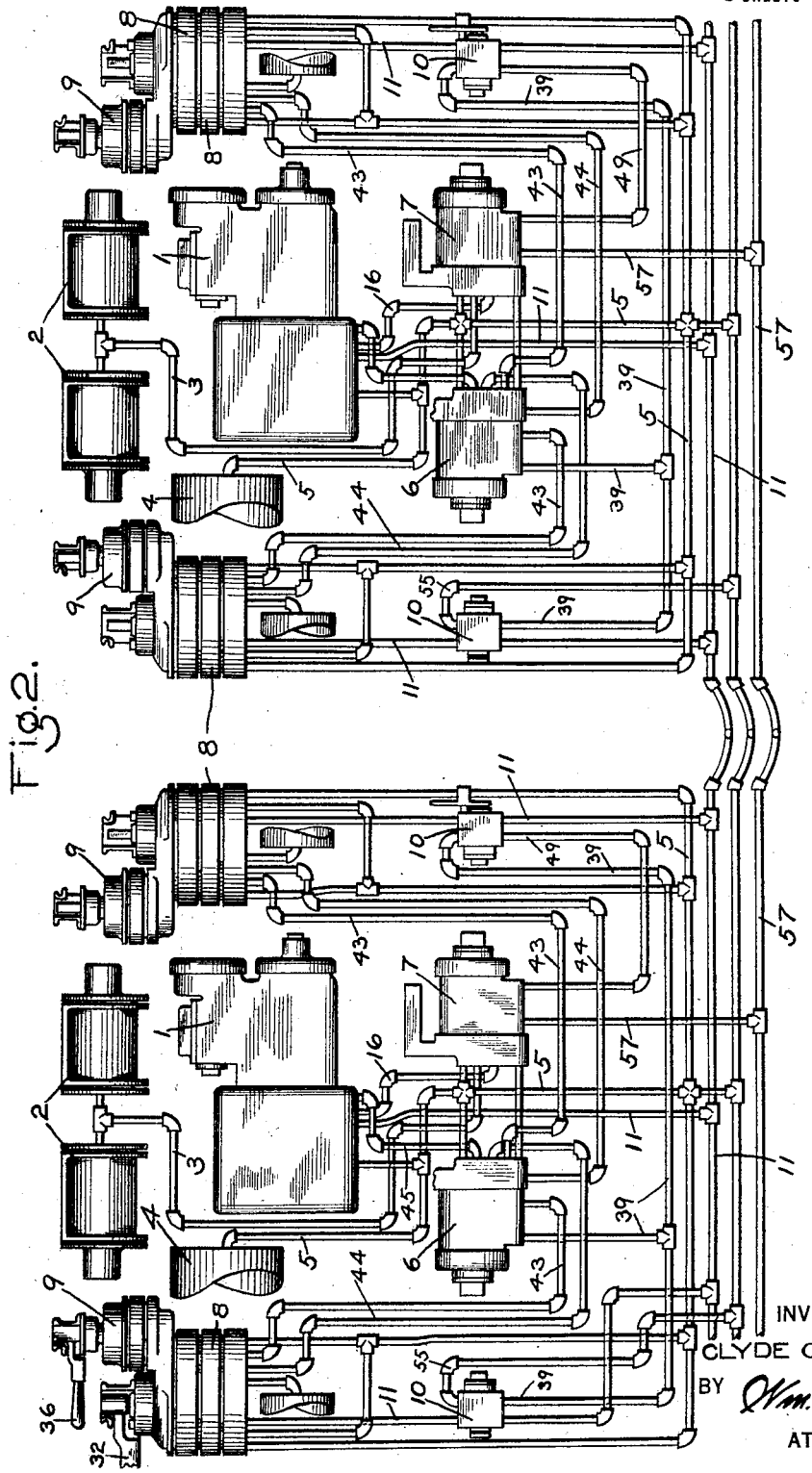

In the accompanying drawings; Figure 1 is a diagrammatic view, with the principal parts in section, of a locomotive brake equipment embodying my invention, and Fig. 2 a diagrammatic view of locomotive brake equipments for two locomotives, connected up for double heading, and illustrating the operation of certain features of my invention.

As shown in Fig. 1 of the drawings, the locomotive brake equipment may comprise a brake controlling valve device 1, preferably of the well known distributing valve type, and preferably located near the longitudinal center of the locomotive, brake cylinders 2, connected to a brake cylinder pipe 3, a main reservoir 4, connected to pipe 5, a transfer valve device 6 for single locomotive operation and a transfer valve device 7 for double heading operation.

At each end of the locomotive, there is provided a combined automatic brake valve 8 and independent brake valve 9, a cut-out cock 10 in the brake pipe 11, the usual feed valve device 12, and reducing valve device 13.

The brake controlling valve device 1 may comprise a casing having an application cylinder 14, connected by passage 15, to an application cylinder pipe 16, and containing an application piston 17. Said piston is adapted to operate an application valve 18 contained in valve chamber 19, and a release valve 20, contained in valve chamber 21.

The casing also has a piston chamber 22, connected by passage 23 to brake pipe 11 and containing an equalizing piston 24 for operating a main slide valve 25 and graduating slide valve 26 contained in valve chamber 27, said valve chamber being connected by a passage 28 with a pressure chamber 29.

The automatic brake valve device 8 may comprise a casing having a valve chamber 30 containing a rotary valve 31 adapted to be operated by handle 32 and is provided with the usual equalizing discharge valve mechanism 33.

The independent brake valve device 9 may comprise a casing having a valve chamber 34, containing a rotary valve 35, adapted to be operated by handle 36.

The transfer valve device 6 and the transfer valve device 7, which are of substantially identical construction, may each comprise a casing having a piston chamber 37 connected to a pipe 39 and containing a piston 40 and having a valve chamber 41, connected to the main reservoir pipe 5 and containing a slide valve 42, adapted to be operated by piston 40.

The brake valve sections 43 and 44 of the distributing valve release pipe and the application cylinder pipe of the brake valves at the right of Fig. 1 are connected by passages to the seat of the slide valve 42 of the transfer valve device 6 as well as the corresponding pipe sections of the brake valves shown at the left of Fig. 1.

The distributing valve section 16 of the application cylinder pipe is connected by a passage to the seat of the slide valve 42 of the transfer valve device 7 and the distributing valve release pipe 45 is connected by a passage to the seat of slide valve 42 of the transfer valve device 6.

In operation, if the brakes are to be controlled from the end of the locomotive at the left of Fig. 1, the cut-out cock 10 at that end is turned to a position in which communication is opened from the brake valve through passage 50 to the brake pipe 11 and the pipe 39 is connected through a cavity 46 with an exhaust port 47. At the non-operating end, the cock 10 is turned to a position in which the brake pipe communication is cut off and pipe 39 is connected through a port 48 with a pipe 49 leading to the piston chamber 37 of the transfer valve device 7.

Fluid pressure in piston chamber 37 of the transfer valve device 6 is therefore vented to the atmosphere and the main reservoir pressure acting in valve chamber 41 shifts the piston 40 and slide valve 42 to the left, as shown in Fig. 1.

Since the pipe 49 is connected to the pipe 39 through the cock 10 at the non-operating end, the piston chamber 37 of the transfer valve device 7 is also vented to the atmosphere, so that the piston 40 and the slide valve 42 will be shifted to the right by main reservoir pressure in valve chamber 41.

Both transfer valve devices 6 and 7 then remain in the above positions, so long as the locomotive is operated as a single unit from the end of the locomotive at the left of Fig. 1.

In the above described position of the transfer valve device 6, the application cylinder pipe section 16 is connected with the section 44 of the brake valve at the left of the drawings, through a cavity 51 in valve 42 of transfer valve device 7, pipe 52 and cavity 51 of slide valve 42 of the transfer valve device 6, while section 45 of the distributing valve release pipe is connected through a cavity 53 with section 43.

The pipes 43 and 44 of the brake valve at the non-operating end are blanked at the slide valve 42 of the transfer valve device 6, so that these sections of pipe are now cut out.

With a locomotive brake equipment of the character shown, the full equalized brake cylinder pressure is calculated as the pressure at which the application cylinder 14, the application chamber 54 and the pressure chamber 29 equalize, but since the application cylinder pipe is connected to the application cylinder, the calculated equalized pressure will be reduced according to the volume of the application cylinder pipe.

Similarly in the "holding" position, the above pressures equalize into the distributing valve release pipe, since the equalizing slide valve 25 is then in release position, so that the equalizing pressure is still further reduced.

It will therefore be seen that by cutting off the application cylinder pipe section and the distributing valve release pipe section leading to the non-operating end of the locomotive, the volumes of these pipes are reduced and the effect on the equalizing pressure is correspondingly diminished.

If the locomotive is to be controlled from the opposite end, the cock 10 at the left of the drawing is turned to a position in which a port 48 in the cock connects a pipe 55, containing fluid at main reservoir pressure to pipe 39, so that fluid from the main reservoir is supplied to the piston chamber 37 of the transfer valve device 6. Fluid pressures being thus equalized on opposite sides of piston 40, a spring 56 shifts the piston and slide valve 42 to their inner positions. In this position, the application cylinder pipe section 44 and the distributing valve pipe section 43 of the brake valve at the left of the drawing are cut off, while the corresponding pipes of the brake valves at the right of the drawing are now connected by the cavities in the slide valve 42 to the corresponding pipes, leading to the distributing valve device 1.

The cock 10 at the right of the drawing is turned to a position, in which communication is opened to the brake pipe through port 50, while the pipe 49 is connected through cavity 46 with exhaust port 47, so that the piston chamber 37 of the transfer valve device 7 is maintained at atmospheric pressure.

In double heading, the cocks 10 on the head locomotive are left in the same position as in operating as a single unit, as shown in Fig. 1, but on the second locomotive, both cocks are turned to the position as shown at the right of Fig. 1.

When both cocks are in this position, the brake pipe will be cut off from the brake valves at each end of the locomotive and fluid under pressure will be supplied from the main reservoir through pipe 55 and passage 48 to pipe 39 at one end of the second locomotive, so that fluid under pressure is supplied to piston chamber 37 of the transfer valve device 6, and fluid under pressure is supplied from pipe 39, through passage 48 in the other cock 10 to pipe 49 and thence to piston chamber 37 of transfer valve device 7.

Both of the transfer valve pistons 40 are therefore moved to their inner positions, in which the application cylinder pipe and the distributing valve release pipe are cut off from communication between the brake valves and the distributing valve device 1, so that the control of the brakes from the second locomotive is cut out.

Provision is however made for the independent control of the brakes on both locomotives from the head locomotive, since the brake cylinder pipe 3 is connected by cavity 53 in slide valve 42 of transfer valve device 7 with an equalizing pipe 57, on the head locomotive, while said equalizing pipe 57 on the second locomotive, which is coupled to the equalizing pipe on the head locomotive, as shown, is connected to the application cylinder 14 of the distributing valve device, through cavity 51 of slide valve 42 of transfer valve device 7, to application cylinder pipe 16.

It will now be seen that when the brakes are applied independently on the head locomotive, fluid supplied to the brake cylinder on that locomotive flows through the equalizing pipe 57 to the second locomotive and thence to the application cylinder of the distributing valve device 1 on the second locomotive.

The result is that the brakes are applied on the second locomotive by the usual operation of the distributing valve device when fluid is supplied to the application cylinder.

An automatic application of the brakes is secured by reducing the brake pipe pressure in the usual manner and of course operates to effect an application of the brakes on both locomotives as well as the train and is not interfered with in any way by the above described apparatus.

Since the brakes are only controlled from the head locomotive, the need for a so-called double heading valve is obviated, while the usual safety features of operation are retained.

Having now described my invention, what I claim as new and desire to secure by Letters Patent, is:—

1. In a locomotive brake equipment, the combination with a brake valve device at each end of the locomotive and a brake controlling valve device having a brake controlling pipe, of a valve device having one position for connecting said pipe to one brake valve and another position for connecting said pipe to the other brake valve and a manually operated cock for controlling the position of said valve device.

2. In a locomotive brake equipment, the combination with a brake valve device at each end of the locomotive and a brake controlling valve device having a brake controlling pipe, of a fluid pressure operated valve device having a position for connecting said pipe to one brake valve and another position for connecting said pipe to the other brake valve and a manually operated cock for controlling the position of said valve device.

3. In a locomotive brake equipment, the combination with a brake valve device at each end of the locomotive and a distributing valve device having two brake controlling pipes, of a transfer valve device adapted to be operated by fluid under pressure for connecting said pipes to one brake valve in one position and to the other brake valve in another position.

4. In a locomotive brake equipment, the combination with a brake valve device at each end of the locomotive and a distributing valve device having an application cylinder and an application cylinder pipe communicating with said cylinder, of a transfer valve device having a position for connecting said pipe to one brake valve and another position for connecting said pipe to the other brake valve.

5. In a locomotive brake equipment, the combination with a brake valve device at each end of the locomotive and a distributing valve device having an application cylinder, an application cylinder pipe, and a distributing valve release pipe, of a transfer valve device having a position for connecting said pipes to one brake valve and another position for connecting said pipes to the other brake valve.

6. In a locomotive brake equipment, the combination with a brake valve device at each end of the locomotive and a brake controlling valve device having a brake controlling pipe, of a valve device for connecting one of the brake valves to said pipe while the other brake valve is cut off.

7. In a locomotive brake equipment, the combination with a brake valve device at each end of the locomotive and a brake controlling valve device having a brake controlling pipe, of a valve device for connecting one of the brake valves to said pipe while the other brake valve is cut off and a manually operated cock for controlling the operation of said valve device.

8. In a locomotive brake equipment, the combination with a brake cylinder and a brake controlling valve device having an application chamber, of an equalizing pipe and a transfer valve device having one position for connecting the brake cylinder to the equalizing pipe on one locomotive and another position for connecting the equalizing pipe to the application cylinder on another connected locomotive.

9. In a locomotive brake equipment, the combination with a brake cylinder and a brake controlling valve device having an application chamber, a variation in pressure in which is adapted to effect an application of the brakes, of an equalizing pipe and a transfer valve device having a position for connecting the brake cylinder to the equalizing pipe on one locomotive and another position for connecting the equalization pipe to the application cylinder on another connected locomotive.

10. In a locomotive brake equipment, the combination with a brake valve device at each end of the locomotive, a brake cylinder, and a distributing valve device having an application chamber, of an equalizing pipe, a transfer valve device for connecting either brake valve to said application chamber while the other brake valve is cut off, and another transfer valve device having one position for connecting the brake cylinder to the equalizing pipe and another position for connecting the equalizing pipe to the application cylinder.

11. In a locomotive brake equipment, the combination with a brake valve device at each end of the locomotive, a brake cylinder, and a distributing valve device having an application chamber, and an application cylinder pipe, of an equalizing pipe, a transfer valve device having positions for connecting either brake valve to the application cylinder pipe while the other brake valve is cut off, and another transfer valve device having one position for connecting the brake cylinder to the equalizing pipe and another position for connecting the equalizing pipe with the application cylinder, communication through the application cylinder pipe being also controlled by said transfer valve device.

12. In a locomotive brake equipment, the combination with a brake valve device at each end of the locomotive, a brake cylinder, and a distributing valve device having an application chamber, and an application cylinder pipe, of an equalizing pipe, a transfer valve device having one position for connecting one brake valve to the application cylinder pipe and another position for connecting the other brake valve to said pipe, and another transfer valve device having a position for connecting the brake cylinder to the equalizing pipe and for establishing communication through the application cylinder pipe.

13. In a locomotive brake equipment, the combination with a brake valve device at each end of the locomotive, a brake cylinder, and a distributing valve device having an application chamber, and an application cylinder pipe, of an equalizing pipe, a transfer valve device having one position for connecting one brake valve to the application cylinder pipe and another position for connecting the other brake valve to said pipe, and another transfer valve device having one position for connecting the brake cylinder to the equalizing pipe and for establishing communication through the application cylinder pipe and another position for connecting the equalizing pipe with the brake cylinder.

14. In a locomotive brake equipment, the combination with a brake valve device, a distributing valve device having an application cylinder, and a brake cylinder, of an equalizing pipe, an application cylinder pipe, and a transfer valve device having a position for connecting the brake cylinder with the equalizing pipe and for establishing communication from the brake valve through the application cylinder pipe to the application cylinder and another position for connecting the equalizing pipe with the application chamber.

15. In a locomotive brake equipment, the combination with a brake controlling pipe and a pair of transfer valve devices for controlling communication through said pipe, of a transfer valve controlling pipe and a cock at each end of the locomotive, the cock at one end having a position for supplying fluid under pressure through said pipe to one transfer valve and another position for venting fluid under pressure from said pipe, and the cock at the other end having a position for connecting said transfer valve controlling pipe to the other transfer valve device.

16. In a locomotive brake equipment, the combination with a brake controlling pipe and a pair of transfer valve devices for controlling communication through said pipe, of a transfer valve controlling pipe and a cock at each end of the locomotive, the cock at one end having one position for supplying fluid under pressure through said pipe to one transfer valve and another position for venting fluid under pressure from said pipe, and the cock at the other end having one position for connecting said transfer valve controlling pipe to the other transfer valve device and another position for venting fluid from the last mentioned transfer valve device.

In testimony whereof I have hereunto set my hand.

CLYDE C. FARMER.